United States Patent
Laemmermann et al.

(10) Patent No.: US 11,329,439 B2
(45) Date of Patent: May 10, 2022

(54) BRUSH FOR AN ELECTRIC MACHINE, IN PARTICULAR OF A MOTOR VEHICLE, AND METHOD FOR DETERMINING WEAR OF SUCH A BRUSH

(71) Applicant: Bayerische Motoren Werke Aktiengesellschaft, Munich (DE)

(72) Inventors: Markus Laemmermann, Munich (DE); Robert Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/677,136

(22) Filed: Nov. 7, 2019

(65) Prior Publication Data
US 2020/0076145 A1    Mar. 5, 2020

Related U.S. Application Data

(63) Continuation of application No. PCT/EP2018/062651, filed on May 16, 2018.

(30) Foreign Application Priority Data

May 30, 2017    (DE) ..................... 10 2017 209 089.8

(51) Int. Cl.
  *H01R 13/58*    (2006.01)
  *H01R 39/58*    (2006.01)
  *H02K 7/00*    (2006.01)

(52) U.S. Cl.
  CPC ............. *H01R 39/58* (2013.01); *H02K 7/006* (2013.01)

(58) Field of Classification Search
  CPC ......... H01R 39/58; H01R 39/26; H02K 7/006
  (Continued)

(56) References Cited

U.S. PATENT DOCUMENTS

| 3,439,206 | A |   | 4/1969 | Grannells |
| 4,034,249 | A | * | 7/1977 | Avery ................... H01R 39/20 |
|  |  |  |  | 310/253 |

(Continued)

FOREIGN PATENT DOCUMENTS

| CN | 101459309 A | 6/2009 |
| DE | 197 43 080 B9 | 10/2004 |

(Continued)

OTHER PUBLICATIONS

PCT/EP2018/062651, International Search Report dated Jul. 6, 2018 (Two (2) Pages).

(Continued)

*Primary Examiner* — Harshad C Patel
(74) *Attorney, Agent, or Firm* — Crowell & Moring LLP

(57) ABSTRACT

A brush for an electric machine includes at least one brush body having an electrical resistance, which is configured to electrically contact at least one component moving relative to the brush body during operation of the electric machine, and which sustains wear during the operation of the electric machine along a wear direction, as a result of friction contact with the component. The brush includes a detection device configured to determine wear of the brush body, where the detection device comprises a plurality of detection zones which are mutually spaced apart along the wear direction, the respective electrical resistance of which differs from the electrical resistance of the brush body.

8 Claims, 2 Drawing Sheets

(58) Field of Classification Search
USPC .... 310/251, 245, 248, 249, 253; 439/620.21
See application file for complete search history.

(56) References Cited

U.S. PATENT DOCUMENTS

| | | | | |
|---|---|---|---|---|
| 4,316,186 | A * | 2/1982 | Purdy | H02K 11/25 340/648 |
| 4,536,670 | A * | 8/1985 | Mayer | H01R 39/58 310/245 |
| 4,636,778 | A * | 1/1987 | Corkran | G08B 21/182 200/61.41 |
| 5,509,625 | A * | 4/1996 | Oullette | B64D 15/12 244/134 D |
| 5,870,026 | A * | 2/1999 | Challenger | H01R 39/58 310/245 |
| 7,045,929 | B2 * | 5/2006 | Yu | H01R 39/58 310/242 |
| 8,384,266 | B2 | 2/2013 | Fish et al. | |
| 2009/0153089 | A1 * | 6/2009 | Hobelsberger | H02K 11/35 318/490 |
| 2010/0244621 | A1 * | 9/2010 | Martin | H01R 39/58 310/248 |
| 2012/0248929 | A1 | 10/2012 | Fish et al. | |

FOREIGN PATENT DOCUMENTS

| | | |
|---|---|---|
| DE | 10 2010 031 415 A1 | 1/2012 |
| DE | 10 2012 102 726 A1 | 10/2012 |
| JP | 57-113669 U | 7/1982 |
| JP | 58-182385 U | 12/1983 |
| RU | 2101814 C1 | 1/1998 |
| WO | WO 99/04460 A1 | 1/1999 |
| WO | WO 2017/001800 A1 | 1/2017 |

OTHER PUBLICATIONS

German Search Report issued in German counterpart application No. 10 2017 209 089.8 dated Feb. 23, 2018, with Statement of Relevancy (Seven (7) pages).

* cited by examiner

BRUSH FOR AN ELECTRIC MACHINE, IN PARTICULAR OF A MOTOR VEHICLE, AND METHOD FOR DETERMINING WEAR OF SUCH A BRUSH

CROSS REFERENCE TO RELATED APPLICATIONS

This application is a continuation of PCT International Application No. PCT/EP2018/062651, filed May 16, 2018, which claims priority under 35 U.S.C. § 119 from German Patent Application No. 10 2017 209 089.8, filed May 30, 2017, the entire disclosures of which are herein expressly incorporated by reference.

BACKGROUND AND SUMMARY OF THE INVENTION

The invention relates to a brush for an electric machine, in particular of a motor vehicle.

A brush of this type for an electric machine and a method of this type for determining wear of such a brush for an electric machine are already known, for example, from DE 10 2010 031 415 A1. The brush, which is configured, for example, as a carbon brush, comprises a brush body, which has an electrical resistance. The brush body is designed for the electrical contacting of at least one component of the electric machine, wherein the component moves relative to the brush body during operation of the electric machine, and in particular rotates. It is thus possible, for example, by means of the brush body, for electrical energy delivered by a second component to be transferred to the first component, which moves relative to the brush body and relative to the second component during the operation of the electric machine, and in particular rotates. The first component is, for example, a commutator or a slip ring of the electric machine.

In order to transfer the electrical energy from the second component to the first component via the brush body, the brush body contacts the component which moves relative to the brush body such that, during the operation of the electric machine, by the movement of the first component relative to the brush body, and by the engagement or contacting of the brush body with the first component, a friction contact is established between the brush body and the first component. As a result of this friction contact, during the operation of the electric machine, the brush body is subject to wear along a wear direction such that, for example as a result of said wear, a length of the brush body along the wear direction is reduced, i.e. becomes smaller.

A detection device is provided, by means of which wear of the brush body can be determined. In other words, in the context of the above-mentioned method, it is provided that wear of the brush body is determined by means of the detection device.

The object of the present invention is to develop a brush and a method of the type mentioned in the introduction such that a particularly advantageous detection of wear can be achieved.

This object is achieved by a brush having the features of patent claim 1, and by a method having the features of patent claim 10. Advantageous configurations of the invention are the subject matter of the dependent claims.

A first aspect of the invention relates to a brush for an electric machine, in particular of a motor vehicle. The brush, which is configured, for example, as a carbon brush, comprises at least one brush body, which has an electrical resistance. The brush body is designed for the electrical contacting of at least one component, in particular of the electric machine, moving relative to the brush body during operation of the electric machine. In other words, with the electric machine in the fully assembled state, the brush body contacts or engages with the component, as a result of which the brush body electrically contacts the component. During the above-mentioned operation of the electric machine, the component moves, in particular rotates, relative to the brush body. As the brush body engages with or contacts the component while the component moves relative to the brush body, and in particular rotates, friction contact is established between the brush body and the component. In other words, the component rubs against the brush body. By means of this friction contact between the brush body and the component, via the brush body and thus via the brush, electrical energy or electric current can be transferred from at least one second component of the electric machine to the first component, in particular while the first component moves, in particular rotates, relative to the second component and relative to the brush body.

By friction contact between the brush body and the first component, it should be in particular understood that friction occurs between the brush body and the first component when the first component moves relative to the brush body during the operation of the electric machine, and thus engages with the brush body. As a result, wear resulting from the above-mentioned friction or the above-mentioned friction contact occurs in the brush body, which thus sustains wear, during the operation of the electric machine, along a wear direction, as a result of friction contact with the component. The brush comprises a detection device, by means of which wear of the brush body can be determined.

In order to permit the determination or detection of wear to the brush body in a particularly advantageous and in particular accurate manner, it is provided according to the invention that the detection device comprises a plurality of detection zones which are mutually spaced apart along the wear direction, the respective electrical resistance of which differs from the electrical resistance of the brush body. In the event of the occurrence, for example, of such wear of the brush body which no longer affects the brush body itself, but affects the respective detection zone of the first component, this results, for example, in a change to an electrical resistance of the brush as a whole. This variation in the electrical resistance of the brush as a whole is also described as a resistance variation, which can be detected, for example, by the detection device, in particular by voltage measurement.

As the plurality of detection zones are provided, which are mutually spaced apart along the wear direction, each resistance variation, signifies for example that a length of the brush body in the wear direction has reduced by a certain length, wherein this certain length corresponds to a respective distance between the respective detection zones along the wear direction. In the brush according to the invention, it is thus possible to determine wear, and thus the length of the brush or the brush body along the wear direction, in a particularly accurate manner, such that a particularly accurate, and in particular timely, detection of wear and forecasting of wear are possible. In particular, it is possible to determine a temporal variation in the length of the brush body, and thus a temporal variation of wear, and a rate at which the length of the brush body declines or at which the brush body undergoes wear such that, for example, the representation of a wear forecast is possible. In the context of forecasting wear, for example, a future time point can be predictively determined at which the brush will assume such a state of wear which will, for example, necessitate the replacement of the brush. It is consequently possible, for example, for a user of the electric machine to receive a timely or early notification of the necessity for the servicing or repair of the electric machine such that, for example, a repair can be executed in the context of a regular servicing interval, in particular before any excessive wear of the brush occurs.

The invention is based in particular upon the recognition that brushes, for example carbon brushes, of electric machines, in particular of externally excited electric machines, are components which are susceptible to wear. In conventional electric machines, a wear detection function, in the context of which the respective wear of the carbon brushes is determined, is not possible and is not provided. The achievement of a wear limit of the respective brush is only detected upon the failure of the electric machine which is configured, for example, as an electric motor. This means that failures of the electric machine which can be operated, for example, as electric motor and/or as generator can occur, and the provision of a secure capacity on the generator for a secure on-board electrical network is not possible. These problems and disadvantages can now be prevented such that, in particular, a secure capacity can be constituted on the generator for the secure operation of an on-board electrical network.

It has proved to be particularly advantageous if the detection zones are embedded in the brush body. This allows wear of the brush body, and thus of the brush as a whole, to be detected in a space-saving and cost-effective manner. The detection zones thus constitute a dopant in the brush or brush body which is configured, for example, as a carbon brush wherein, for example, if the respective detection zone, rather than the brush body itself, contacts the first component, there is a resulting change in the electrical resistance of the brush as a whole. It can thus be exploited that electric machines, in particular externally excited electric machines, can already incorporate a voltage measurement function which can be employed, in a simple manner, for the detection of resistance variation.

It has proved to be particularly advantageous if different dopants are provided. In other words, it is preferably provided that the detection zones have electrical resistances which differ from one another, as a result of which a particularly accurate detection of the length of the brush body is possible. In the event, for example, that a first of the detection zones contacts the first component, a first resistance variation occurs. Thereafter, for example, if a second of the detection zones contacts the first component, a second resistance variation occurs, which differs from the first resistance variation. As these resistance variations differ from each other, by reference to said resistance variations it can easily be detected that, for example, firstly the first detection zone, and thereafter the second detection zone contacts the first component, as a result of which the length of the brush body can be detected in a particularly accurate manner. A conclusion can accordingly be drawn with respect to the wear of the brush body.

In a further embodiment of the invention, the brush body is constituted of one material wherein, along the wear direction, a respective body region of the brush body constituted of the material is arranged between the respective detection zones. The material of which the brush body is constituted is, for example, graphite, such that the brush is configured, for example, as a carbon brush. By the arrangement of the body region between the detection zones, wear of the brush body up to the respective detection zone can be determined in a particularly accurate manner. The respective detection zone is constituted, for example, by a detection element, wherein the detection elements or detection zones are interconnected, for example, by means of the body region which is arranged between the latter.

Advantageously, at least three detection zones are provided, pairs of which can have the same mutual spacing along the wear direction. This allows, wear, in particular the rate of wear of the brush body to be determined in a particularly accurate manner.

A further embodiment is characterized in that the brush body is constituted of the above-mentioned material as first material, wherein the respective detection zone is constituted of a second material which differs from the first material. This allows the electrical resistances of the brush body and of the respective detection zone to be particularly clearly mutually distinguished, such that wear can be detected in a particularly accurate manner.

It has proved to be particularly advantageous if the first material, at least predominantly or entirely, comprises graphite. The brush body is thus configured as a graphite brush body, such that the brush, is configured for example as a carbon brush.

A further embodiment is characterized in that the second material, in particular at least predominantly, comprises a metallic material.

In order to permit particularly accurate detection of wear of the brush body, in a further configuration of the invention it is provided that the detection zones and the brush body, with respect to the electrical resistances thereof, are connected in series.

Finally, it has proved to be particularly advantageous if the detection device incorporates an evaluation unit, which is configured to detect an overall electrical resistance constituted by the electrical resistances of the detection zones and of the brush body. In a new state, i.e. if the brush body has yet to sustain any wear or has only sustained light wear, when all the detection zones are still present, the overall resistance, for example, assumes a first value. As wear increases, the above-mentioned first detection zone is for example worn away, and thus removed, such that the brush then no longer comprises at least the first detection zone. The overall resistance then assumes a second value, with reference to which, in a simple and cost-effective manner, it can be determined that the brush body has been worn to such an extent that the first detection zone is no longer present, but the second detection zone is however still in place. A particularly accurate conclusion can thus be drawn with respect to a state of wear of the brush body and thus of the brush as a whole.

A second aspect of the invention relates to a method for determining wear of a brush for an electric machine, in particular of a brush according to the invention. In the method, the brush comprises at least one brush body having an electrical resistance, which electrically contacts at least one component moving, in particular rotating, relative to the brush body, in particular of the electric machine, during operation of said electric machine and, during the operation of the electric machine, sustains wear along a wear direction as a result of friction contact with the component. In the method, the brush moreover comprises a detection device, by means of which wear of the brush body is determined.

In order to permit the determination of wear of the brush body in a particularly accurate and simple manner, it is provided according to the invention that the detection device comprises a plurality of detection zones which are mutually spaced apart along the wear direction, the respective electrical resistance of which differs from the electrical resistance of the brush body. Wear of the brush body is thus determined, for example, in dependence on an overall electrical resistance constituted by the brush body and the detection zones. Accordingly, wear of the brush body is determined by means of the detection zones. Advantages and advantageous configurations of the first aspect of the invention are to be considered as advantages and advantageous configurations of the second aspect of the invention, and vice versa.

Further details of the invention proceed from the following description of a preferred exemplary embodiment, with reference to the associated drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
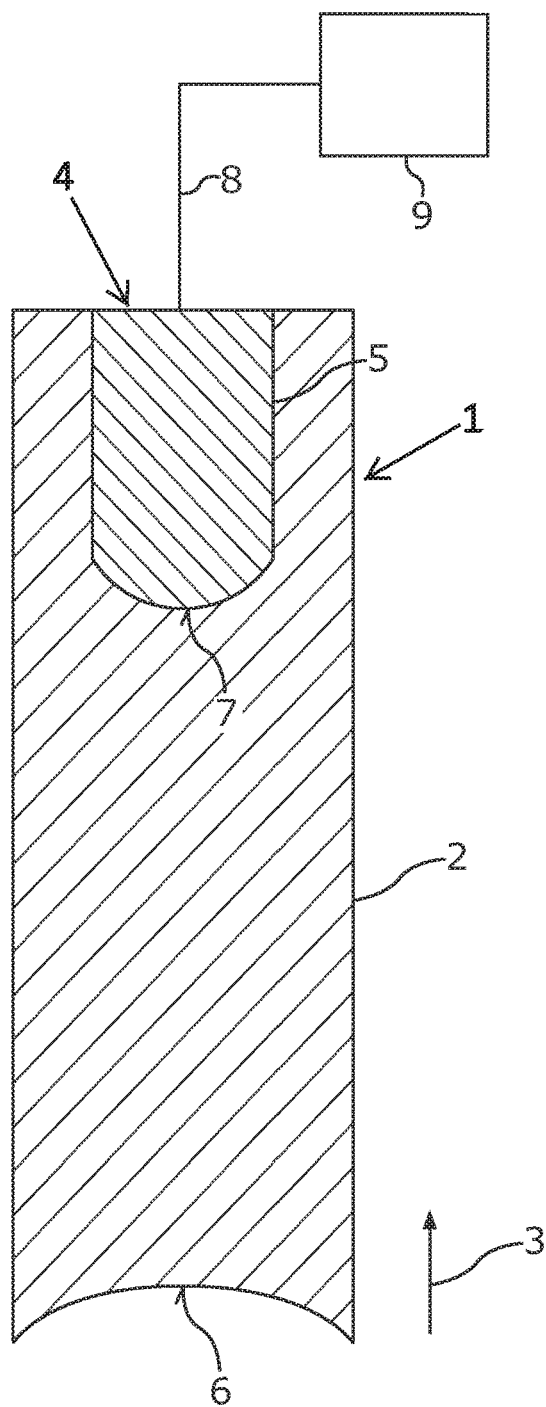
FIG. 1 shows a schematic overhead view of a brush for an electric machine, having a brush body and having a detection element which is configured as a wear pill, with which the brush body is provided such that, by means of the wear element, wear of the brush body can be determined, wherein FIG. 1 clarifies the background to the invention.

FIG. 1 shows a schematic overhead view of a brush 1 for an electric machine, in particular of a motor vehicle. The motor vehicle is configured, for example, as a car, in particular as a private car, and comprises the electric machine. The electric machine is, for example, operable in a motor mode, and thus as an electric motor such that, for example, at least one wheel of the motor vehicle, and thus in particular the motor vehicle as a whole, can be driven by means of the electric motor or by means of the electric machine. Alternatively or additionally, the electric machine is operable, for example, in a generator mode, and thus as a generator.

The brush 1 comprises a brush body 2 which is constituted, for example, of a first material. The first material is, for example, graphite such that, for example, the brush body 2 is constituted of graphite powder. The brush body 2 is thus configured for the electrical contacting of at least one first component which moves, in particular rotates, relative to the brush body 2 during operation of the electric machine. In other words, in the fully assembled state of the electric machine, the brush body 2 engages with or contacts the above-mentioned first component such that the brush body 2 electrically contacts the first component. It is thus possible, for example, via the brush body 2, and thus via the brush 1 as a whole, for electrical energy or electric current which is supplied by a second component of the electric machine to be transferred to the first component. To this end, the brush body is electrically conductive or conducting. The first material is hereby electrically conductive, such that the electric current supplied by the second component can be transmitted via the first material to the first component.

As the first component moves, in particular rotates, relative to the brush body 2 during operation of the electric machine, and as the brush body 2 thus engages with or contacts the first component, friction contact, and thus friction, occurs between the first component and the brush body 2. As a result of the friction contact of the brush body 2 with the first component, or as a result of the above-mentioned friction between the component and the brush body 2, the brush body 2 undergoes wear during the operation of the electric machine along a wear direction which is indicated in FIG. 1 by an arrow 3. Along the wear direction, or parallel to the wear direction, the brush body 2 thus has a length which, as a result of wear or in response to increasing wear, decreases along the wear direction, i.e. becomes smaller.

The brush 1 comprises a detection device 4, which is in particular schematically represented in FIG. 1, by means of which wear of the brush body 2 is detectable. To this end, the detection device 4 comprises a wear element which, in the exemplary embodiment illustrated in FIG. 1, is configured as a wear pill 5. The brush body 2 is provided with the wear pill 5 such that the wear pill 5 is integrated in the brush body 2.

The brush body 2 comprises an end face 6, which faces the first component, by means of which the brush body 2 contacts the first component. With increasing wear, the end face 6 progressively moves in the direction of the wear element (wear pill 5). Before the brush body 2 reaches its wear limit, the brush body 2 is arranged in the wear direction between the wear pill 5, in particular an end face 7 of the wear pill 5, and the first component. The first component is thus contacted by the brush body 2 via the end face 6 and not for example the wear pill 5.

However, if the brush body 2 reaches its wear limit, the brush body 2 itself is no longer in contact with the first component, but the wear pill 5, via its end face 7, engages in electrical contact with the first component such that the first component is contacted by the wear pill 5, and no longer by the brush body 2. The brush body 2 thus undergoes such wear or such depletion that the wear pill 5 is released. This results, for example, in the wear pill 5 generating an, in particular electric, signal which, for example, is transmitted for example via a line 8 from the wear pill 5 to an evaluation unit 9 of the detection device 4. The signal generated by the wear pill 5, transmitted via the line 8 to the evaluation unit 9 and received by the evaluation unit 9, it is determined or detected that the brush body 2 has reached its wear limit. This reaching of the wear limit by the brush body 2 can in particular be detected sufficiently early, before a failure of the electric machine occurs.

As a result of the detection that the brush body 2 has reached the wear limit, for example an optical and/or acoustic and/or haptic signal can be output, in particular in the interior space of the vehicle, such that, for example, a person present in the interior space of the vehicle, such as, for example, the driver of the vehicle, can be alerted to the fact that the wear limit has been reached by the brush body 2. Thereafter, for example the electric machine can be serviced or repaired such that, for example, the worn brush body 2 or the worn brush 1 can be replaced with a new, unworn brush, in particular before a failure of the electric machine occurs. The brush body 2 reaching the wear limit results, for example, in a change in the electrical resistance of the brush 1, wherein the electrical resistance is detected, for example, by the evaluation unit 9, in particular using the above-mentioned signal. This means that, by the detection of the change in the electrical resistance of the brush 1, the fact that the brush body 2 has reached the wear limit can be concluded.

Figure 2:
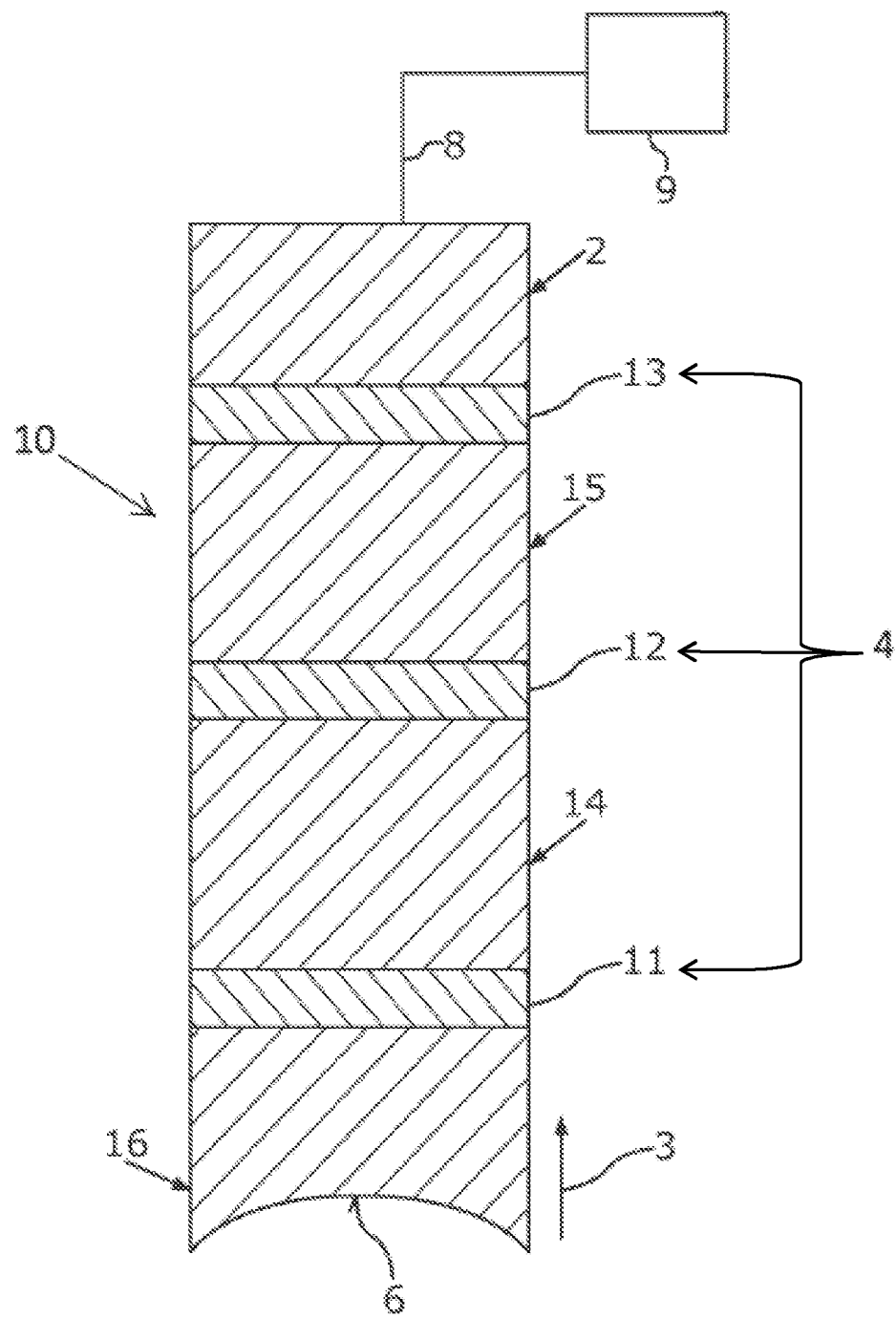
FIG. 2 shows a schematic overhead view of a brush according to the invention for an electric machine, having a detection device for detecting wear of a brush body of the brush, wherein the detection device comprises a plurality of mutually spaced apart detection zones arranged along a wear direction.

FIG. 2 shows a brush 10 for an electric machine, wherein the preceding statements regarding the brush 1, with respect to the functions thereof in the electric machine, are readily transferable to the brush 1, and vice versa. In order to permit the detection of wear to the brush body 2 of the brush 10 in a particularly accurate and simple manner, the detection device 4 comprises a plurality of detection zones 11, 12, 13 which are mutually spaced apart along the wear direction, the respective electrical resistance of which differs from the electrical resistance of the brush body 2. It is preferably provided that the detection zones 11, 12, 13, with respect to their electrical resistances, are mutually distinguished in pairs.

In the exemplary embodiment illustrated in FIG. 2, the detection zones 11, 12, 13 are embedded in the brush body 2 wherein, along the wear direction, between the respective detection zones 11, 12 or 12 and 13, a respective body region 14 or 15 of the brush body 2, constituted of the first material, is arranged. The respective detection zone 11, 12, 13 is, for example, constituted of a respective second material, which differs from the first material. Alternatively or additionally, it is conceivable that the detection zones 11, 12 and 13, with respect to their respective materials, are mutually distinguished in pairs. In the exemplary embodiment illustrated in FIG. 2, three detection zones 11, 12 and 13 are provided which, in pairs, have the same mutual spacing along the wear direction.

Firstly, the end face 6 is constituted of a body region 16 of the brush body 2 which is constituted of the first material, such that the body region 16 firstly contacts the first component via the end face 6. The body region 16 is thus firstly arranged between the detection zone 11 and the first component. This means that, initially, the brush body 2 electrically contacts the first component via the body region 16 or via the end face 6. If such wear is then sustained by the brush 10 such that the body region 16 is removed, the brush body 2 itself will no longer engage with the first component, but the detection zone 11 will contact or engage with the first component. Thereafter, for example, a first variation in an electrical resistance of the brush 10 occurs, wherein this first variation in the electrical resistance, in particular in the overall resistance, of the brush 10 signifies, for example, that 25 percent of the original length of the brush body 2 which has the original length in the unworn, new state, has been removed, and thus worn away. Accordingly, 75 percent of the original length is still present.

If, in the further operation of the electric machine, the detection zone 11 and the body region 14 are worn away and accordingly removed, the detection zone 12 can then engage in electrical contact with the first component, thereby resulting in a second variation in the electrical resistance of the brush 10. The evaluation unit 9 can here detect the respective variation in the electrical resistance of the brush 10 such that, using the first variation in the electrical resistance, wear of the body region 16 can be detected and, using the second variation in the electrical resistance, wear of the detection zone 11 and of the body region 14 can be detected. On the basis of the detection of the second variation in the electrical resistance, it can thus be concluded that 50 percent of the original length of the brush body 2 has been worn away, such that the brush body 2 still then has 50 percent of its original length.

If, in the further operation of the electric machine, such wear occurs to the brush 10 that the detection zone 12 and the body region 15 are worn away or removed such that, for example, the detection zone 13 then engages in, in particular direct, electrical contact with the first component, a third variation in the electrical resistance of the brush 10 can accordingly be detected by means of the evaluation unit 9. From this third variation in the electrical resistance, it can be concluded that 25 percent of the original length of the brush body 2 is still present, such that 75 percent of the original length has already been worn away. Using the detection of the third variation in the electrical resistance it can be detected, for example, that the brush body 2 has reached its wear limit. Then, for example, the above-mentioned signal can be output in order, for example, to alert a user of the motor vehicle to the fact that the wear limit has been reached before a failure of the electric machine occurs. Thereafter, the brush 1 can be replaced, before the electric machine fails.

Wear to the brush body 2 of the brush 10 is detected, for example, such that the detection zones 11, 12 and 13, and the brush body 2, with respect to their electrical resistances, are connected in series. Thus, for example by means of the evaluation unit 9, an overall electrical resistance of the brush 10 constituted by the electrical resistances of the detection zones 11, 12 and 13 and by the electrical resistance of the brush body 2 is detected, such that, for example, wear of the brush body 2 is detected in relation to the overall resistance. This is executed, for example, such that the value of the overall resistance changes whenever the respective detection zone 11, 12 or 13 engages in electrical contact with the first component. Given that, for example, the detection zones 11, 12 and 13 differ from one another with respect to their electrical resistances in a paired arrangement, the respective variations, in particular the values thereof, also differ from one another in a paired arrangement. In the context of a method for determining the wear of the brush 10, wear to the brush 10, in particular to the brush body 2, can thus be determined by means of the detection zones 11, 12 and 13.

The respective variation in the electrical resistance is detected, for example, by voltage measurement. For example, the respective variation in the electrical resistance leads to a variation in an electric voltage of the electric machine, wherein this variation in the electric voltage can be detected, for example, by means of the evaluation unit 9. For example, the electric voltage which is present, for example, at the brush 10, is monitored over the line 8 by the evaluation unit 9 such that, in the event of a variation in the electric voltage, electrical contact of the respective detection zone 11, 12 or 13 with the first component can be concluded. In this manner, wear of the brush body 2 can be detected in an accurate manner.

Overall, it will be seen that the brush 10 permits an exceptionally early representation of the detection of wear and the forecasting of wear. As a result, a user of the electric machine or of the motor vehicle can be alerted to corresponding wear of the brush body 2 particularly early, and in particular prior to the failure of the electric machine. In consequence, the reaching of the wear limit, or an inordinate overshoot of the wear limit in the brush body 2 can be prevented, such that failure of the electric machine can be avoided. This can be achieved, for example, such that, prior to the reaching of the wear limit or prior to an inordinate overshoot of the wear limit, the electric machine is serviced or repaired wherein, for example, the brush 10 is replaced with a new, unworn brush. Moreover, a secure capacity can be achieved on the electric machine which is operable, for example, as a generator, as a result of which a particularly secure on-board electrical network of the motor vehicle can be constituted, for example.

LIST OF REFERENCE NUMERALS

1 Brush
2 Brush body
3 Arrow
4 Detection device
5 Wear pill
6 End face
7 End face
8 Line
9 Evaluation unit
10 Brush
11 Detection zone
12 Detection zone
13 Detection zone
14 Body region
15 Body region
16 Body region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brush for an electric machine comprising:
   a brush body having an electrical resistance, which is configured to electrically contact at least one component moving relative to the brush body during operation of the electric machine, and which sustains wear during the operation of the electric machine along a wear direction, as a result of friction contact with the component; and
   a detection device configured to determine wear of the brush body,
   wherein the detection device comprises a plurality of detection zones which are mutually spaced apart along the wear direction, the respective electrical resistance of which differs from the electrical resistance of the brush body,
   wherein the brush body is constituted of a first material wherein, along the wear direction, a first body region of the brush body constituted of the first material with the electrical resistance of the brush body is arranged between a first one and a second one of the plurality of detection zones and wherein, along the wear direction, a second body region of the brush body constituted of the first material with the electrical resistance of the brush body is arranged between the second one and a third one of the plurality of detection zones,
   wherein the detection zones are disposed within the brush body, and
   wherein the first and the second body regions of the brush body each extend perpendicularly with respect to the wear direction from a first distal end of the brush to a second distal end of the brush.

2. The brush according to claim 1, wherein pairs of the plurality of detection zones have a same mutual spacing along the wear direction.

3. The brush according to claim 1, wherein the respective detection zone is constituted of a second material which differs from the first material.

4. The brush according to claim 3, wherein the first material is at least predominantly graphite.

5. The brush according to claim 4, wherein the second material is at least predominantly a metallic material.

6. The brush according to claim 1, wherein the detection zones and the brush body are connected in series with respect to the respective electrical resistances of the detection zones and the brush body.

7. The brush according to claim 1, wherein the detection device comprises an evaluation unit configured to detect an overall electrical resistance constituted by the respective electrical resistances of the detection zones and of the brush body.

8. A method for determining wear of a brush for an electric machine, in which the brush comprises a brush body having an electrical resistance, which electrically contacts at least one component moving relative to the brush body during operation of the electric machine and, during the operation of the electric machine, sustains wear along a wear direction as a result of friction contact with the component, the method comprising:
   determining wear of the brush body using a detection device of the brush,
   wherein, the detection device comprises a plurality of detection zones which are mutually spaced apart along the wear direction, the respective electrical resistance of which differs from the electrical resistance of the brush body,
   wherein the brush body is constituted of a first material wherein, along the wear direction, a first body region of the brush body constituted of the first material with the electrical resistance of the brush body is arranged between a first one and a second one of the plurality of detection zones and wherein, along the wear direction, a second body region of the brush body constituted of the first material with the electrical resistance of the brush body is arranged between the second one and a third one of the plurality of detection zones,
   wherein the detection zones are disposed within the brush body,
   wherein said determining wear of the brush body comprises determining wear of the brush body using the plurality of detection zones, and
   wherein the first and the second body regions of the brush body each extend perpendicularly with respect to the wear direction from a first distal end of the brush to a second distal end of the brush.

* * * * *